US006986358B2

(12) United States Patent
Mattox et al.

(10) Patent No.: US 6,986,358 B2
(45) Date of Patent: Jan. 17, 2006

(54) METHOD AND COMPOSITION TO DECREASE IRON SULFIDE DEPOSITS IN PIPE LINES

(75) Inventors: Mark Andrew Mattox, Foley, AL (US); Edward J. Valente, Clinton, MS (US)

(73) Assignee: Synergy Chemical Inc., Foley, AL (US)

( * ) Notice: Subject to any disclaimer, the term of this patent is extended or adjusted under 35 U.S.C. 154(b) by 122 days.

(21) Appl. No.: 10/218,905

(22) Filed: Aug. 15, 2002

(65) Prior Publication Data

US 2003/0062316 A1 Apr. 3, 2003

Related U.S. Application Data

(60) Provisional application No. 60/373,381, filed on Apr. 17, 2002, provisional application No. 60/312,647, filed on Aug. 15, 2001.

(51) Int. Cl.
*E21B 37/06* (2006.01)
*C09K 7/06* (2006.01)

(52) U.S. Cl. .................. 137/13; 210/235; 210/236; 210/634; 210/638; 210/709; 210/712; 210/724; 210/748; 210/912; 423/150.1; 585/818

(58) Field of Classification Search ............... 210/235, 210/236, 634, 638, 709, 712, 724, 748, 912; 423/150.1; 585/818; 137/13, 22.11, 22.13, 137/22.14, 22.16
See application file for complete search history.

(56) References Cited

U.S. PATENT DOCUMENTS

| | | | |
|---|---|---|---|
| 3,030,421 A | | 4/1962 | Reuter et al. |
| 3,947,276 A | | 3/1976 | Siclari et al. |
| 4,044,055 A | | 8/1977 | Katz |
| 4,078,101 A | | 3/1978 | Cole |
| 4,370,236 A | | 1/1983 | Ferguson |
| 4,874,526 A | * | 10/1989 | Grade et al. ............... 210/697 |
| 4,931,164 A | * | 6/1990 | Dickakian ............... 208/48 AA |
| 5,127,231 A | * | 7/1992 | Larue et al. ................ 62/633 |
| 5,190,662 A | * | 3/1993 | Keller et al. .............. 210/673 |
| 5,500,126 A | * | 3/1996 | Fries ....................... 210/668 |
| 5,820,766 A | | 10/1998 | Gevertz et al. |
| 6,001,264 A | * | 12/1999 | Suzuki et al. ............. 210/697 |
| 6,153,100 A | | 11/2000 | Mitchell |
| 6,177,047 B1 | * | 1/2001 | Kuczynski et al. .......... 422/15 |
| 6,905,605 B2 | * | 6/2005 | Klomp ...................... 210/698 |

FOREIGN PATENT DOCUMENTS

| | | |
|---|---|---|
| GB | 2 145 708 A | 4/1985 |
| WO | WO 99/23261 A1 | 5/1999 |
| WO | WO 00/21892 A1 | 4/2000 |
| WO | WO 02/08127 A1 | 1/2002 |

OTHER PUBLICATIONS

Krauter, et al., "An Easy and Practical Synthetic Route to Electron Rich Water Soluble Ligands: α-Aminomethylation of Trishydroxymethylphosphine," *Tetrahedron*, 56:771-774 (2000), Elsevier Science Ltd., Great Britain.

Jeffery, et al., "Self assembly of a novel water soluble iron(II) macrocyclic phosphine complex from tetrakis (hydroxymethyl)phosphonium sulfate and iron (II) ammonium sulfate: single crystal X-ray structure of the complex $[Fe(H_2O)_2\{RP(CH_2N(CH_2PR_2)CH_2)_2PR\}]SO_4 \cdot 4H_2O$ (R=$CH_2OH$)", *Chem. Commun.*, 101-102 (2000), The Royal Society of Chemistry, Great Britain.

Gilbert, et al., "Tetrakishydroxymethylphosphonium Sulfate (THPS) For Dissolving Iron Sulfides Downhole and Topside—A Study of the Chemistry Influencing Dissolution," *Corrosion 2002*, Paper No. 02030 (2002), NACE International, USA.

* cited by examiner

*Primary Examiner*—Minh-Chau T. Pham
(74) *Attorney, Agent, or Firm*—Foley & Lardner LLP

(57) ABSTRACT

The levels of iron sulfide present in a conduit, such as a pipeline, are reduced by contacting the conduit, on an inner surface, with a composition obtained from an aqueous solution containing at least one compound of Formula (I)

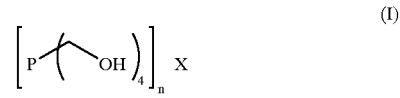

(I)

and at least one amine or corresponding ammonium derivative in the presence of a solvent, wherein X is an anion of valency n. Preferably, the pH of the solution is about 8. Alternatively, the method employs a composition comprising tris(hydroxymethyl)phosphine (TRIS) and at least one amine or corresponding ammonium derivative. The amine preferably is ammonia or a primary alkylamine. The compositions readily complex and thereby dissolve deposits of iron(II) sulfide, removing them from the conduit.

40 Claims, No Drawings

METHOD AND COMPOSITION TO DECREASE IRON SULFIDE DEPOSITS IN PIPE LINES

CROSS-REFERENCE TO RELATED PATENT APPLICATIONS

This application claims benefit of priority to U.S. provisional applications Ser. No. 60/373,381, filed Apr. 17, 2002, and No. 60/312,647, filed Aug. 15, 2001.

BACKGROUND OF THE INVENTION

This invention relates to methods and compositions to decrease or remove iron sulfide deposits in or on a conduit of a gas stream.

Hydrogen sulfide ($H_2S$) is a pernicious, naturally occurring contaminant of fluids that is encountered, for example, during the manipulation of oil or gas. The corrosive nature of $H_2S$ typically leads to the accumulation of particulate iron sulfide, which can become easily entrained in hydrocarbons as well as in glycol, salts, and other contaminants, forming intractable deposits on the surfaces of conduits such as pipelines. Such deposits present a significant problem to the oil and gas industries because the pipelines must be cleaned physically. Additionally, the iron sulfide deposits hinder accurate determinations of pipeline structural integrity, which can be assessed by instrumentation known as SMART PIGS.

A limited repertoire of techniques has been available for reducing or removing iron sulfide deposits from pipelines. U.S. Pat. No. 5,820,766 to Gevertz et al., for example, describes the use of inorganic bromates or iodates to oxidize fluid-entrained sulfides to solid elemental sulfur, which must be mechanically collected and removed from a pipeline. A byproduct of this mechanical cleaning is a sludge that can be flammable and must be disposed of in a landfill. U.S. Pat. No. 4,370,236 to Ferguson discloses a method in which iron sulfide is removed from a gas stream by washing it with a mixture of a hydrocarbon and water. The resultant aqueous phase contains soluble and particulate iron sulfide which must be removed by further physical and chemical processing steps. For example, see U.S. Pat. No. 6,153,100.

An alternate approach as informed by general chemical principles is to solubilize iron sulfide in water. Iron (II) and iron (III) ions generally form relatively water-insoluble compounds at neutral pHs. Such iron compounds begin to precipitate from aqueous solution at pH values of 5 or greater. For example, iron (II) precipitates from neutral solutions at pH 7 and oxidizes to iron (III) hydroxide in the presence of oxygen. Thus, the usual method to render a water insoluble iron (II) or iron (III) compound soluble in water is to treat the solid in an aqueous mixture with a strong mineral acid which lowers the pH, thereby dissolving the iron compound. In the case of iron (II) sulfide, however, this method results in the evolution of hydrogen sulfide, and if in sufficient amount (greater than 437 $cm^3$/L at 0° C.) to its release as a toxic gas from the solution. An additional disadvantage of using of strong mineral acids to clean pipelines is that most pipes are made of steel or iron, which are susceptible to attack by strong acids, thereby producing corrosion, deterioration, and pitting. Furthermore, such attack also produces hydrogen gas, which is flammable and explosive in air.

Yet another approach to the removal of iron sulfide is disclosed in PCT publication WO 02/08127, which describes the use of aqueous compositions of tris(hydroxymethyl)phosphine or a corresponding phosphonium salt (collectively, "THP") below or well below neutral pH. The '127 PCT publication discloses, however, that the use of THP, at the pH required to rapidly complex iron sulfide, is fraught with practical barriers, including the formation of an insoluble polymer, when THP is formulated with ammonia as a co-reagent, and the oxidation of THP to the non-complexing tris(hydroxymethyl)phosphine oxide. In light of these problems, the '127 PCT publication discloses that iron sulfide can be chelated by amino carboxylic acids or amino phosphonic acids in formulations with THP. According to the publications, the use of THP in the absence of ammonium ion or ammonia provides a small synergistic effect on iron sulfide dissolution. Because the acid co-reagents are expensive, however, their use is undesirable when large quantities are necessary to remove iron sulfide deposits.

Accordingly, there is a continued need in the art for an improved method of removing iron sulfide deposits that employs safe, readily available and inexpensive materials, which requires minimum mechanical intervention, and that avoids chemical pitfalls, such as polymeric precipitates, of prior art methods.

SUMMARY OF THE INVENTION

To address these and other needs, the present invention provides a composition obtained by a process comprised of combining at least one compound of Formula (I)

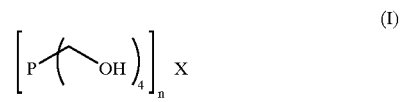

(I)

with at least one amine or ammonium derivative thereof in the presence of an aqueous solvent. In Formula (I), X is an anion that has a valency of n, the number of phosphonium cations present. Preferably, the pH of the aqueous solvent is adjusted to between about 4.5 and about 10, more preferably between about 6 and about 9. Still more preferred is a pH of about 8.

In accordance with another aspect, the invention provides a method of decreasing the level of iron sulfide in a conduit. The inventive method comprises contacting the conduit with the composition described above, forming a second composition, and then removing the second composition from the conduit. This approach derives in part from the unexpected discovery that the composition readily solubilizes iron sulfide.

Yet another aspect of the present invention concerns a composition comprising tris(hydroxymethyl)phosphine (TRIS), at least one amine or ammonium derivative thereof, and a solvent.

This invention also provides a method for decreasing the level of iron sulfide in a conduit, by contacting the conduit with the composition of TRIS, as described above, to form a second composition, and then removing the second composition from the conduit.

The present invention can be implemented in relation to a variety of conduits, such as dry gas conduits and processed fluid conduits. Furthermore, the invention contemplates both the continuous administration of compositions of the present invention and intermittent administration, i.e., a batch process.

In one embodiment of the invention, the anion X of Formula (I) is monoanionic, dianionic, or trianionic. Thus, acceptable anions are selected from but are not limited to chloride, bromide, iodide, lower alkyl carboxylates, bisulfite, bisulfate, hydrocarbyl sulfonates, dihydrogenphosphate, nitrate, hexafluorophosphate, sulfate, sulfite, monohydrogenphosphate, and phosphate. Preferred anions include chloride and sulfate, and preferred compounds of Formula (I) thus are tetrakis(hydroxymethyl)phosphonium chloride and tetrakis(hydroxymethyl)phosphonium sulfate.

Amines that are particularly useful in the practice of this invention include but are not limited to ammonia, alkylamines, dialkylamines, alkylenediamines, and cycloalkylamines. Additionally, the conjugate acids of these amines are also efficacious. Preferably, the amine is ammonia or an alkylamine. More preferably, the amine is ammonia or methylamine. A preferred conjugate acid is ammonium chloride.

The present invention typically involves the use of a solvent. Specifically, for a composition and method that employ compounds of Formula (I), the solvent is an aqueous solvent. Preferred solvents include but are not limited to water and alcohols. The solvent also may comprise two or more solvents, such as water and an alcohol. A preferred alcohol is methanol.

For compounds of Formula (I) and for TRIS, as well as for amine or ammonium derivatives thereof, relative amounts and concentrations employed according to the present invention can vary widely. According to one aspect of the invention, the amount of a compound of Formula (I) or TRIS ranges from about 1% to about 90% (w/w), preferably 5% (w/w), and more preferably 1% (w/w). In another aspect of the invention, the amount of amine or ammonium derivative thereof can vary between about 0.05% to about 2.0% (w/w). The amounts are all based upon the total weight of the composition. The relative amounts of the components of the compositions are adjusted according to the molar ratio of phosphorus to nitrogen. For compositions that comprise one or more compounds of Formula (I), this molar ratio is based upon the molar amount of phosphorus contained in the phosphonium ions of Formula (I). For the compositions that instead comprise TRIS, the molar ratio is simply based upon the molar amount of TRIS. In either sort of composition, the molar ratio of phosphorus to nitrogen can vary between about 1:1 to about 15:1. Preferably, the molar ratio is about 1.5:1 to about 8:1. The most preferred molar ratio is about 2.5:1.

DETAILED DESCRIPTION OF THE PREFERRED EMBODIMENTS

The present invention effectively decreases the levels of iron sulfide in conduits, such as processed fluid pipelines and dry gas pipelines. The iron sulfide may be in a gas stream or, for example, on the surface of a conduit of a gas stream. The conduit retaining or containing the iron sulfide must be brought into contact with a composition of this invention, whereby iron sulfide forms a soluble complex that can be easily removed from the conduit. The invention is performed at or near neutral pH and, hence, is non-corrosive to pipes and other conduits.

Composition

The compositions of this invention are particularly effective at complexing and solubilizing iron sulfide. According to one aspect of the invention, this result is readily achieved by providing one or more compounds of Formula (I) in admixture with at least one amine or ammonium derivative thereof. The anion X balances the net positive charge of one or more phosphonium cations. Typically, n in Formula (I) is 1, 2, or 3. Thus, X is typically a monoanion, dianion, or trianion, respectively.

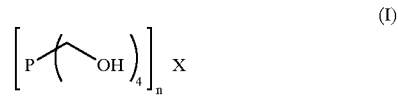

While any routinely accessible anion X can be used, it is preferred that X is chosen such that compounds of Formula (I) are soluble in water, alcohols, or in mixtures thereof. Thus, suitable monoanions include halides such as chloride, bromide, and iodide. Also contemplated are lower alkyl carboxylates, wherein the term "lower alkyl" refers to a straight or branched $C_1$–$C_6$ alkyl group. Exemplary lower alkyl carboxylates are methyl carboxylate (i.e., acetate), ethyl carboxylate, and propyl and iso-propyl carboxylates. Other monoanions include sulfur-based anions such as bisulfite, bisulfate, and hydrocarbyl sulfonates. Hydrocarbyl sulfonates are anions of the formula $RS(O)_2O^-$ wherein R is a lower alkyl or aryl group. Examples of hydrocarbyl sulfonates include, but are not limited to, methylsulfonate, benzenesulfonate, paratoluenesulfonate, and the isomers of xylenesulfonate. Still other suitable monoanions include nitrate and hexafluorophosphate.

Dianions X include sulfate, sulfite, and monohydrogenphosphate. An acceptable trianion is phosphate.

Compounds of Formula I are commercially available or can be obtained routinely by known syntheses. For example, particularly preferred compounds of Formula (I) are tetrakis(hydroxymethyl)phosphonium sulfate and tetrakis(hydroxymethyl)phosphonium chloride, both of which are available commercially, for example, from Rhodia (Cranberry, N.J.), Nippon Industries (Tokyo, Japan), and Cytec Industries (Mobile, Ala.). Tetrakis(hydroxymethyl)phosphonium sulfate is normally available as an aqueous acidic solution having a pH of between 1 and 4. Other compounds of Formula (I) bearing different anions X can be prepared straightforwardly by the well-known reaction between phosphine and formaldehyde in the presence of an aqueous acid HX as described, for example, in the procedure of U.S. Pat. No. 4,044,055 to Katz et al.

The amine or its ammonium derivative, which is combined with one or more compounds of Formula (I), can be selected from a variety of amines and their conjugate acids. It is preferred but not essential that if the amine or its conjugate acid is a solid, then it should be soluble in the solvent employed in the composition of this invention. Similarly, if the amine or its conjugate acid is a liquid, then it is preferably miscible with the solvent. One suitable amine is ammonia.

Primary amines, such as alkylamines, are particularly efficacious in the practice of this invention. Exemplary alkylamines include, but are not limited to, methylamine, ethylamine, normal- and iso-propylamines, and normal- and tert-butylamines. Other primary amines include alkylenediamines, such as 1,2-diaminoethane and 1,3-diaminopropane. Still other exemplary primary amines are cycloalkylamines, such as cyclopropylamine, cyclobutylamine, cyclopentylamine, and cyclohexylamine.

Ammonium derivatives of these amines can also be used. An ammonium derivative is the conjugate acid of an amine. A conjugate acid of an amine is obtained by the formal addition of an acid to that amine. Suitable acids include inorganic acids such as HCl, HBr, HI, and phosphoric acid, and organic acids such as carboxylic acids. Thus, the present invention contemplates a variety of ammonium derivatives. Particularly preferred ammonium derivatives include ammonium chloride, ammonium nitrate, methylammonium chloride, and ethylammonium chloride.

According to certain embodiments of this invention, the composition is made by combining suitable amounts of at least one compound of Formula (I) and at least one amine or ammonium derivative thereof in the presence of an aqueous solvent. The order of addition of the reagents can be varied, although it is preferred that the amine or ammonium derivative is added to a solution of a compound of Formula (I) wherein the pH has been adjusted as described below. Particularly preferred solvents include water and an alcohol. Alternatively, mixtures of water and an alcohol can be used. Exemplary alcohols include methanol, ethanol, and isopropanol.

In preferred embodiments, the amount of a compound of Formula (I) is about 5% (w/w), or even as little as 1% (w/w), based on the total weight of the composition. A sufficient amount of amine or ammonium derivative thereof varies from about 0.05 to about 2.0% (w/w) based on the total weight of the composition.

The pH of the mixture described above optionally is adjusted to a value between about 4.5 to about 10. Alternatively, solid compounds of Formula (I) can be dissolved in or solutions thereof diluted with an aqueous solvent in which the pH already has been adjusted to between about 4.5 to about 10. In either instance, the addition of an appropriate acid or base will effect the desired pH adjustment. Suitable acids include hydrochloric and sulfuric acids. Suitable bases include sodium and potassium hydroxides, and organic bases such as triethylamine.

For embodiments that employ commercially available aqueous solutions of tetrakis(hydroxymethyl)phosphonium sulfate, the pH must be raised. This is accomplished by adding a suitable base to the mixture. The pH can be maintained by the use of a buffer. In an exemplary procedure, 0.1 mole of acetic acid is dissolved in less than 0.5 liters of water and is adjusted to pH 5 by adding 2.0 molar sodium hydroxide, and the mixture is diluted with water to a volume of nearly 1 liter, readjusted to pH 5 with sodium hydroxide, and finally brought to a volume of 1.0 liter. Alternatively, one may employ sodium or potassium acetate and acetic acid such that the total amount of acetate ion from either source amounts to 0.1 mole, dilute the resulting solution to nearly 1 liter, adjust the pH to 5 with acetic acid, and dilute the solution to exactly 1.0 liter. Other buffers, such as phosphate and citrate, are serviceable in the prescribed pH range. Additionally, nitriloacetic acids can be used as buffers. Exemplary acids include nitrilotriacetic acid (NTA) and ethylenediamine-N,N,N',N'-tetraacetic acid (EDTA).

As mentioned above, the present invention is generally effective at complexing iron sulfide over a wide pH range. The inventor has discovered that the rate of iron sulfide complexation increases with increasing pH. Thus, the preferred pH is about 6 to about 9, and the most preferred pH is about 8. To illustrate, in laboratory experiments utilizing an aqueous solution of 0.015M $FeSO_4$, 0.03M $NH_4^+$ and 0.06M tetrakis (hydroxymethyl)phosphonium sulfate buffered to a pH of 4.5, the rate of iron complexation at 22° C. was 0.5 hour. The rate decreased to 0.01 hour for an analogous solution at a pH of about 5.0. For these determinations, the rate is defined as the time required to raise the absorbance of the solution at 500 nm to 1.0.

Without wishing to be bound by any particular theory or principle, the inventor believes that compounds of Formula (I), particularly when exposed to aqueous solutions having elevated pH, furnish tris(hydroxymethyl)phosphine (TRIS). A convenient method for the production of TRIS is thus realized by adjusting the pH of an aqueous solution of tetrakis(hydroxymethyl) phosphonium sulfate to pH 8 by the addition of sodium or potassium hydroxide, whereby 95% of phosphorus in the resultant solution is in the form of water-soluble TRIS. This transformation has been described in the art. See K. A. Petrov et al., *Zhurnal Obshchei Khimii* 32 (1962) 553. Alternatively, TRIS may be synthesized in the reaction between phosphine, formaldehyde, and potassium tetrachloroplatinate. See U.S. Pat. No. 3,030,421 to Reuter et al. Tris(hydroxymethyl)phosphine also is available commercially, for example, from Strem Chemicals, Inc. (Newburyport, Mass.).

Another embodiment of this invention, a composition of TRIS, derives in part from the surprising discovery that the reaction products of TRIS and at least one amine or ammonium derivative thereof are effective scavengers of iron sulfide in a conduit. According to the invention the amine or its ammonium derivative, as described above, is combined with TRIS in a solvent to form a solution. If an ammonium derivative is utilized in an aqueous solvent, then it is preferable, although not necessary, to elevate the pH of the solution.

The composition can be prepared by two primary routes. In one embodiment, TRIS is first prepared from an aqueous solution of a compound of Formula (I), such as tetrakis (hydroxymethyl)phosphonium sulfate or chloride, by the known method described above. The resultant solution, which contains TRIS, is combined directly with an amine or ammonium derivative, or solutions thereof, to form the composition. In an alternative embodiment, a solution of pure TRIS in a solvent can be combined with an amine or ammonium derivative. Preferably, the amine is ammonia or a primary amine such as methylamine or ethylamine. Methylamine is most preferred. The preferred solvents are those which dissolve TRIS. Polar solvents, such as alcohols or alcohol-water mixtures, are preferred solvents.

In preferred embodiments, the composition contains TRIS in an amount of about 5% (w/w), or even as little as 1% (w/w), based on the total weight of the composition. A sufficient amount of amine or ammonium derivative thereof varies from about 0.05 to about 2.0% (w/w) based on the total weight of the composition.

The methods and compositions of this invention are effective for a range of relative amounts of compounds of Formula (I) or TRIS and an amine or ammonium derivative thereof. The molar ratio of phosphorus, as contained in the phosphonium ions of Formula (I) or in TRIS, to nitrogen in the amine or ammonium derivative, can vary from about 1:1 to about 15:1. A preferred molar ratio is about 1.5:1 to about 8:1. Still more preferred is a molar ratio of about 2.5:1.

If the amine is ammonia or if the ammonium derivative is an ammonium salt (e.g., $NH_4Cl$), then a polymeric precipitate may be observed in the course of determining the optimum ratio. Nevertheless, even under optimum ratio conditions and the resultant formation of a precipitate, the precipitate eventually dissolves to yield a composition exhibiting diminished but evident iron sulfide dissolving ability. Alternatively, the precipitate can be avoided altogether, with no deleterious effect on the eventual removal of iron sulfide, by using a higher-than-optimal phosphorus: nitrogen molar ratio. Additionally, use of a primary amine as described above does not lead to the polymeric precipitate and, hence, provides a surprising advantage over prior-art compositions that lead to the precipitate. Moreover, if ammonia and an alkylamine are employed simultaneously, the tolerance for ammonia without formation of a precipitate is improved in the pH range useful for this invention, producing solutions which are also efficacious in iron sulfide dissolution. Thus, those compositions of the invention that are comprised of alkylamines provide an advantage in the form of complexation of iron sulfide associated with water effluent that is entrained with ammonia.

The compositions of the present invention optionally comprise one or more additives, which render the compositions applicable to a wide range of conduits wherein iron sulfide deposits present a problem. The additives include surfactants; biocides, such as glutaraldehyde and 2,2-dibromo-3-nitrilopropionamide (DBPNA); water dispersants; demulsifiers; scale inhibitors; corrosion inhibitors; antifoaming agents, oxygen scavengers such as diethylhydroxylamine (DEHA); and flocculants.

Surfactants include anionic, amphoteric, cationic, and non-ionic surfactants, which generally contain a hydrophilic moiety and hydrophobic substituents such as alkyl, alkenyl, cycloalkyl, cycloalkenyl, aryl, alkaryl, arylalkyl, and polyaryl groups of 6 to 24, preferably 10 to 20, and more preferably 12 to 18 carbon atoms. The hydrophobic substituents also include polymeric moieties, such as polysiloxanes and polyoxypropylenes.

Examples of anionic surfactants include sparingly water-soluble salts of sulfonic or mono-esters of sulfuric acid, such as alkylbenzene sulfonates, alkyl sulfates, alkyl ether sulfates, olefin sulfonates, alkane sulfonates, alkylphenol sulfates, alkylphenol ether sulfates, alkylethanolamide sulfate, alkylethanolamidether dulfate, and alpha sulfo fatty acids or the corresponding esters each containing from 6 to 24 carbon atoms.

Other exemplary anionic surfactants are soaps such as linoleates, alkyl ether carboxylates, palmitates, resinates, oleates, and stearates; and alkyl sulfosuccinates such as sodium di-2-ethylhexylsulfosuccinate and sodium dihexylsulfosuccinate, acyl taurides, isethionates, alkyl ether sulfosuccinates, acyl sarcosinates, and alkyl sulfosuccinates.

The anionic surfactant may be an anionic phosphate ester, alkyl phosphonate, alkyl amino- or iminomethylene phosphonate. Each of these surfactants generally contain at least one hydrophobic substituent described above. Ether-bearing surfactants contain one or more glyceryl, oxyethylene, oxypropylene, and oxybutylene groups.

While preferred anionic surfactants are sodium salts, other salts of commercial import include those of lithium, potassium, calcium, and magnesium. Still other salts are those of ammonia, monoethanolamine, diethanolamine, triethanolamine, lower alkylamines, alkyl- and hydroxyalkylphosphonium.

Non-ionic surfactants include tertiary acetylinic glycols, polyethoxylated alcohols, polyethoxylated mercaptans, polyethoxylated carboxylic acids, polyethoxylated amines, polyethoxylated hydroxyalkyl amides, polyethoxylated alkyl phenols, polyethoxylated glyceryl esters, and the propoxylate or mixed ethoxylated and propoxylated derivatives thereof. Polymeric non-ionic surfactants include block copolymers of polyoxypropylene and polyethylene, and copolymers of polyoxybutylene and polyoxyethylene or polyoxybutylene and polyoxypropylene.

Amphoteric surfactants include any water soluble surfactant compound comprised of a hydrophobic moiety, such as a $C_{6-20}$ alkyl or alkenyl group, and a hydrophilic moiety containing an amine or quaternary ammonium group and a carboxylate, sulfate, or sulfonic acid. Exemplary amphoteric surfactants include betaines, such as imidazoline betaines. Others include alkyl amine ether sulfates, sulfobetaines, and quaternary amine or quaternized imidazoline sulfonic acids and salts thereof. Still other suitable surfactants include Zwitterionic surfactants such as N-alkyl taurines and carboxylate amido amines. Specific examples include, but are not limited to, 2-tallow alkyl, 1-tallow amido alkyl, 1-carboxymethyl imidazoline and 2-coconut alkyl, and N-carboxymethyl-2-(hydroxyalkyl)imidazoline.

Cationic surfactants useful in the present invention include alkylammonium salts having at least 8, preferably 10 to 30, and more preferably 12 to 24 aliphatic carbon atoms. Particularly preferred cationic surfactants are tri- and tetraalkylammonium salts. Typically, the cationic surfactant will bear one or two aliphatic chains of 8 to 20 carbons apiece, and two or three short alkyl groups of one to four carbon atoms apiece. Specific examples include dodecyl trimethyl ammonium salts and benzalkonium salts bearing one long and two short alkyl groups.

Other useful cationic surfactants include N-alkyl pyridinium salts wherein the alkyl groups has 8 to 22, and preferably 10 to 20, carbon atoms.

The cationic surfactant may also be an alkaryl dialkylammonium salt. The alkyl groups each have from one to four aliphatic carbon atoms, and the alkaryl groups is, for example, an alkyl benzene group having 8 to 22 carbon atoms.

Still another class of cationic surfactants include alkyl imidazoline salts, such as alkyl methyl hydroxyethyl imidazolinium salts. Examples include alkyl methyl hydroxyethyl imidazolinium salts, alkyl benzyl hydroxyethyl imidazolinium salts, and 2-alkyl-1-alkylamidoethyl imidazoline salts.

Certain amido amines are useful as cationic surfactants. These are formed by reacting a fatty acid, ester, glyceride, or amide forming derivative thereof, with a di- or poly-amine. Exemplary polyamines are ethylene diamine and diethylene triamine.

The cationic surfactant includes an anion, which may be any anion that confers water-solubility to the surfactant. Suitable anions include, but are not limited to, those anions X in Formula (I) described above.

The foregoing surfactants also include polyfluorinated derivatives thereof. Particularly preferred surfactants of this class include polyfluorinated alkyl sulfates and polyfluorinated quaternary ammonium salts.

The surfactants of this invention are preferably those which can be used as wetting agents. Wetting agents lower the surface tension between water and a hydrophobic solid surface, such as the interior surface of a pipeline.

The amounts of a surfactant in the compositions of this invention can vary widely. Typically, the surfactant is present in an amount relative to the weight of a compound of Formula (I) or TRIS of about 50:1 to about 1:200, preferably about 20:1 to about 1:100, and most preferably about 10:1 to about 1:50. Particularly preferred ratios are from about 2:1 to about 1:15.

Scale and corrosion inhibitors that are useful in this invention include, but are not limited to, phosphonates, such as 1-hydroxyethane-1,1,-diphosphonate, polymaleates, polyacrylates, polymethyacrylates, polyphosphates, phosphate esters, soluble zinc salts, nitrates, sulfites, benzoates, tannin, ligninsulfonates, benzotriazole and mercaptobenzothiazole amines, imidazolines, and quaternary ammonium compound resins.

An exemplary class of flocculants is polyacrylamide dispersants. Anti-foaming agents include acetylinic diols, silicones, and polyethoxylated derivatives thereof. Exemplary biocides include tin compounds and isothiazolones.

The compositions of this invention may also comprise non-surfactant biopenetrants, such as those described in U.S. Pat. No. 4,778,813. Exemplary non-surfactant biopenetrants include poly[hydroxyethylene(dimethyliminio)ethylene (dimethyliminio)methylene dichloride], poly[hydroxyethylene(dimethyliminio)-2-hydroxypropylene(dimethyliminio) methylene dichloride], and N-[3-(dimethylammonio) propyl]-N-[3-(ethyleneoxyethylenedimethylammonio) propyl]urea dichloride.

An alternative class of non-surfactant biopenetrants are hydrotropes, which, in concentrations of about 1% or higher, increase the water solubility of sparingly or moderately soluble solutes. Exemplary hydrotropes are water soluble glycol ethers, such as diethylene glycol monomethyl ether. Other hydrotropes include lower alkylaryl sulfonate salts of sodium, potassium, ammonium.

When present in a composition of this invention, the non-surfactant biopenetrant can be used in an amount of less than about 50%, preferably less than about 20%, more preferably less than about 10%, and most preferably less than about 5% (w/w) based on the weight of a compound of Formula (I) or TRIS in the composition.

The foregoing additives preferably are combined with pre-formed compositions of this invention. For example, a compound of Formula (I) or TRIS is combined with an amine or ammonium derivative, as described above. Then one or more additives are added to the resultant composition. The additives can be added as pure compounds or as commercially available preparations thereof, such as aqueous solutions.

The compositions of the present invention can be prepared in advance and stored until needed. The compositions are moderately sensitive to oxygen. Therefore, it is preferred but not essential that the compositions be purged with and stored under an atmosphere of an inert gas, such as dinitrogen. Alternatively, the compositions simply may be stored under an atmosphere of an inert gas or even in tightly closed and nearly full containers, to minimize the volume of air in the container headspace.

Method of Decreasing Levels of Iron Sulfide

The methods of the present invention are highly effective in solubilizing iron sulfide. This object is achieved by contacting a conduit containing iron sulfide with a composition of this invention to form a second composition, and then removing the second composition from the conduit.

The methods are broadly applicable to conduits that are contaminated or otherwise obstructed with iron sulfide deposits. The conduits include any vessel that can carry water, gas, or other fluids. Examples of conduits include but are not limited to pipelines, valves, filters, filtering devices, tanks, storage facilities. Conduits that are of particular relevance in the oil and gas industries are pipelines, which can carry dry gas, processed fluid, or both. Thus, a particular advantage of the present invention in this context is that the pH of the compositions introduced into the pipelines can be adjusted and controlled, thereby effecting the easy manipulation, maintenance, and removal of the compositions. The invention also contemplates the treatment of water and aqueous systems, such as tank waters, that are contaminated with iron sulfide. In this context, removal of iron sulfide will decrease the tendency for obstruction of filtering devices by iron sulfide, and thereby decrease the need for the conventional strong mineral acid treatments which typically result in the concomitant attack of iron pipes and other iron containment systems.

The compositions of this invention can be introduced into conduits by any means, or combination of means, necessary to bring the compositions into contact with iron sulfide deposits. The compositions can be introduced continuously or intermittently, i.e., batch-wise, into operating gas or fluid pipelines, for example. Alternatively, batch introduction is effective for offline pipelines, which have been temporarily taken out of service for cleaning. Industrial procedures include pigging, which is effective for the treatment of pipelines. The compositions can even be introduced into pipelines following the conventional pigging procedure to remove residual iron sulfide. Additionally, the compositions can be used in the ongoing treatment of such pipelines to maintain low levels of iron sulfide.

While the use of any particular composition of this invention is effective in removing iron sulfide from conduits, the optimum molar ratio of phosphorus to iron for a given composition is about 5:1. The optimum molar ratio can depend somewhat upon the amine or ammonium derivative contained in the composition, and is easily determined by routine experimentation. For example, a phosphorus to iron ratio of 4:1 is particularly effective for compositions of TRIS and ammonia, giving solutions that appear pink to magenta, depending on concentration of complexed iron sulfide. A phosphorus to iron ratio of 5.1:1 is most effective for compositions of TRIS and methylamine, which typically yield iron sulfide complexes ranging in color from salmon-orange to deep orange-brown, depending on the concentration of complexed iron sulfide. Molar ratios that deviate from an optimum ratio can be readily employed, however, wherein complexation and dissolution of iron sulfide will occur, albeit at slower rates. In any event, the solutions of solubilized iron sulfide, once formed, increasingly become pale yellow as the iron slowly oxidizes if exposed to air, but nevertheless remain homogeneous.

The following examples are given to illustrate the present invention. It should be understood, however, that the invention is not to be limited to the specific conditions or details described in these examples.

EXAMPLE 1

Composition Generated from Tetrakis (hydroxymethyl)phosphonium Sulfate (THPS) and Ammonium Chloride A. Tetrakis (hydroxymethyl)phosphonium sulfate (THPS) is obtained commercially as a 75–90 weight % aqueous solution with pH that varies below 4. The following procedure yielded 1000 g of a 5% aqueous composition able to complex iron sulfide. 66.6 grams of 75 weight % THPS (in water) and 0.5 grams ammonium chloride were combined, diluted with 90 grams of water, and then mixed. A sufficient amount of a 30% weight aqueous solution of sodium or potassium hydroxide was added to raise the pH to about 6.5. The total weight of the product was brought to 1000 grams by adding water, whereupon the pH was remeasured. After dilution, pH can be readjusted slightly, if necessary, to the desired value.

In this example, water can be replaced with methanol in varying amounts to produce solutions with as little as 0% water and as much as 95% water, depending upon the overall relative amounts of THPS and water in the solutions. More concentrated compositions can be prepared by simply limiting the amount of water or alcohol used to dilute the reactant solution.

B. Commercial quantities of the composition were prepared by following this procedure. Twenty-six (26) gallons of tetrakis(hydroxymethyl) phosphonium sulfate as a 75% aqueous solution were diluted to a total of nearly 380 gallons with deionized water. The resultant acidic solution was adjusted to a pH of 7.7 with 40% aqueous potassium hydroxide, and the volume was brought to 390 gallons with deionized water. After mixing well, ammonium chloride (0.47 lbs) was added and the resultant mixture was thoroughly dissolved with stirring. The pH required readjustment to pH 7.7 with a small amount of 40% aqueous potassium hydroxide. The resultant composition was stored in nearly filled sealed containers, under an optional blanket of dinitrogen.

EXAMPLE 2

Composition Generated from Tetrakis (hydroxymethyl)phosphonium Sulfate (THPS) and Methylamine Following the procedure in Example 1, a 5% by weight composition was prepared by 1) combining 6.66 g of tetrakis (hydroxymethyl)phosphonium sulfate in the form of its 75% aqueous solution by weight with enough water to make 90 mL of solution, 2) adding concentrated (12M aqueous KOH) caustic to form TRIS (95% conversion) at a pH of 7.7, 3) diluting with water to 100 mL, 4) adding 0.263 grams of methylamine, and 5) mixing. The mole ratio of TRIS to amine in this mixture is 2.6:1.

EXAMPLE 3

Determination of Optimum Ratio of Reactants to Iron

The following determinations demonstrate how the relative molar amounts of TRIS and an amine source affect optimum iron (II) complexation. In these determinations, iron (II) sulfate heptahydrate, a water soluble iron (II) compound, was selected as a convenient standard iron source. TRIS was generated using the general procedures set forth in Examples 1 and 2.

The complex formed from TRIS, ammonia, and iron (II) exhibits an absorbance maximum in the vicinity of 490 nm. To find the optimum ratio of reactants, the absorbances of various compositions of the complexing components were measured. The optimal molar ratio of the components [TRIS, ammonia, iron (II)] was observed to be 20:8:5.

A similar trial using methylamine gave a complex with an absorption maximum at 473 nm, and an optimal ratio (in moles) of 26:10:5 for [TRIS, methylamine, iron (II)].

EXAMPLE 4

Complexation of Insoluble Iron Sulfide

Iron (II) sulfide was precipitated from aqueous solution by combining a soluble iron (II) compound and a soluble sulfide in equimolar proportions in sufficient amounts as to exceed the solubility of iron (II) sulfide. In this example, the combination of 1.65 mL of an 0.172M solution of iron (II) sulfate heptahydrate and 1.65 mL of an 0.172M solution of sodium sulfide nonahydrate in a solution with total volume of 50.0 mL resulted in the precipitation of 25 mg black iron (II) sulfide, or a dispersion of about 500 mg iron (II) sulfide per liter of solution.

A. Complexation of Iron Sulfide in a Dispersion 20 mL of the 5% by weight aqueous composition prepared in Example 2 was agitated with 25 mg iron sulfide in a total of 50 mL water. The ratio of TRIS:methylamine was calculated to be 26:10. The iron (II) sulfide dissolved at 22° C. at an initial rate of about 1800 ppm/hr to about 33 ppm/hr when either the composition or iron sulfide became depleted.

Alternatively, 20 mL of the aqueous composition of Example 1 was agitated with the iron sulfide dispersion. Within 30 minutes, all of the iron sulfide had been dissolved, as confirmed by a steady increase in the solution absorbance at about 500 nm.

B. Complexation of an Iron Sulfide Deposit on a Filter

The iron (II) sulfide dispersion prepared as above was filtered onto a cloth filter by suction. The cloth with entrained iron sulfide was placed into contact with 50 mL of 0.1 molar citrate buffer in water at pH 5 and 20 mL of the composition of Example 1, and shaken. The cloth filter was rendered completely free of precipitate in less than 20 hours, during which the absorbance of the surrounding solution at 500 nm increased.

EXAMPLE 5

Dependence of Forming Compositions That Complex Iron (II)

This example shows that the compositions and methods of the present invention that employ tetrakis(hydroxymethyl) phosphonium sulfate (THPS) are pH-dependent.

For each entry in the following table, a stock solution containing $FeSO_4$ (0.015M), $NH_4^+$ (0.030M), THPS (0.06M) and phosphate buffer (0.1M) were used at 22° C. Initial solutions are essentially colorless. The 0.1M phosphate buffer was used to stabilize the pH at which each trial was performed.

TABLE 1

| pH | Time (h) to reach Absorbance of 1.0 at 500 nm |
|---|---|
| 1.2 (unbuffered) | too slow to be detected |
| 2.68 buffered | 26 |
| 2.82 buffered | 12.5 |
| 2.97 buffered | 3.5 |
| 4.54 buffered | 0.5 |
| 4.96 buffered | 0.01 |

The results show that iron sulfide complexation occurs much more rapidly for compositions prepared from THPS at increasing pH. At pH values above 5, complexation rates continue to accelerate, and at pH 7.5, for example, full complexation is complete within a few seconds.

EXAMPLE 6

Pig Pill Batch Procedure

This example shows how a pipeline containing iron sulfide deposits can be cleaned using a composition and method of this invention.

A pig is launched into a pipeline and set at a known location in the pipeline. A sufficient amount of the aqueous composition prepared as in Example 1 is injected into the line. A second pig is launched to form a column of fluid between the two pigs that will cover the entire circumference of the pipeline wall. The pig pill is launched moving at six miles per hour depending on the control of pressure used to move the pigs. A third pig with a carrier fluid can be launched for additional cleanup of any loose particulate left behind. Samples can be taken at the pig receiver to evaluate if additional pigging is necessary.

EXAMPLE 7

Non-Pigging Procedure

This procedure may be necessary for pipelines with particularly severe iron sulfide buildup or if a pipeline is not equipped with pig receivers and launchers. Some type of separation or holding vessels may be necessary up the line. An aqueous composition of this invention is injected into the pipeline on a continuous basis upstream of the iron buildup. Flow rate and pressure are monitored, and samples are taken when possible. The iron sulfide deposits are removed through the continuous flow of the composition through the pipeline.

EXAMPLE 8

Batch and Pig Procedure

The aqueous composition of Example 1 is introduced batch-wise into a pipeline via gravity feed or injection depending upon the internal pressure of the pipeline. A pig is then launched following the batch treatment with the aqueous composition to move the solution along the line. For best results, the pig should be moved at six miles per hour. Samples can be taken at the pig receiver to evaluate if additional pigging is necessary. All volumes of composition used are based on length, inside diameter of the pipe, and the severity of dust, slug, or buildup in the pipeline. The pig type can be chosen based on the severity of the buildup in the line.

Although the present invention has been described and illustrated with respect to preferred embodiments and a preferred use thereof, it is not to be so limited since modifications and changes can be made therein which are within the full scope of the invention as set forth in the appended claims.

What is claimed is:

1. A method of decreasing the level of iron sulfide in a conduit that has an internal surface, comprising
  (a) contacting said internal surface with a first composition, obtained by a process comprised of combining at least one compound of Formula (I):

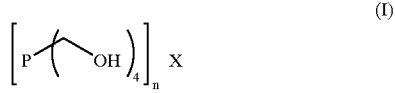

(I)

with at least one amine or ammonium derivative thereof in the presence of an aqueous solvent, wherein X is an anion of valency n, whereby a second composition is obtained; and
  (b) removing from said conduit said second compositions, whereby the level of said iron sulfide in said conduit is decreased.

2. The method of claim 1, wherein said conduit is a dry gas conduit.

3. The method of claim 1, wherein said conduit is a processed fluid conduit.

4. The method of claim 1, wherein said composition is added continuously to said conduit.

5. The method of claim 1, wherein said composition is added intermittently to said conduit.

6. The method of claim 1, wherein said amine or ammonium derivative is selected from the group consisting of alkylamines and the conjugate acids thereof.

7. The method of claim 6, wherein said amine or ammonium derivative is methylamine.

8. The method of claim 1, wherein said amine or ammonium derivative is selected from the group consisting of methylamine, ethylamine, propylamine, isopropylamine, butylamine, tertbutylamine, 1,2-diaminoethane, 1,3-diaminopropane, cyclopropylamine, cyclobutylamine, cyclopentylamine, cyclohexylamine, and the conjugate acids thereof.

9. The method of claim 1 wherein the molar ratio of phosphorus not in X to nitrogen in said amine or ammonium derivative thereof is from about 1:1 to about 15:1.

10. The method of claim 9, wherein said molar ratio is from about 1.5:1 to about 8:1.

11. The method of claim 10, wherein said molar ratio is about 2.5:1.

12. The method of claim 1, wherein said solvent is water or a mixture comprising water and an alcohol.

13. The method of claim 12, wherein said alcohol is methanol.

14. The method of claim 12, wherein said solvent is water.

15. The method of claim 12, wherein the pH of said solvent is between about 4.5 to about 10.

16. The method of claim 15, wherein said pH is between about 6 to about 9.

17. The method of claim 16, wherein said pH is about 8.

18. The method of claim 1, wherein said compound is present in an amount between 1 to 90% by weight of said composition.

19. The method of claim 18, wherein said compound is present in an amount of 5% by weight of said composition.

20. The method of claim 19, wherein said compound is present in an amount of 1% by weight of said composition.

21. The method of claim 1, wherein said amine or ammonium derivative thereof is present in an amount between 0.05 to 2.0% by weight of said composition.

22. A method of decreasing the level of iron sulfide in a conduit, comprising:
  (a) contacting said conduit with a composition comprising tris(hydroxymethyl)phosphine (TRIS), at least one amine or ammonium derivative thereof, and a solvent whereby a second composition is obtained; and
  (b) removing from said conduit said second composition, whereby the level of said iron sulfide in said conduit is decreased.

23. The method of claim 22, wherein said conduit is a dry gas conduit.

24. The method of claim 22, wherein said conduit is a processed fluid conduit.

25. The method of claim 22, wherein said composition is added continuously to said conduit.

26. The method of claim 22, wherein said composition is added intermittently to said conduit.

27. The method of claim 22, wherein said amine or ammonium derivative is selected from the group consisting of ammonia, alkylamines, dialkylamines, alkylenediamines, cycloalkylamines, and the conjugate acids thereof.

28. The method of claim 27, wherein said amine or ammonium derivative is selected from the group consisting of ammonia, alkylamines, and the conjugate acids thereof.

29. The method of claim 28, wherein said amine or ammonium derivative is selected from the group consisting of ammonia, methylamine, and ammonium chloride.

30. The method of claim 28, wherein said amine or ammonium derivative is selected from the group consisting of methylamine, ethylamine, propylamine, isopropylamine, butylamine, tertbutylamine, 1,2-diaminoethane, 1,3-diaminopropane, cyclopropylamine, cyclobutylamine, cyclopentylamine, cyclohexylamine, and the conjugate acids thereof.

31. The method of claim 22, wherein the molar ratio of TRIS to amine or ammonium derivative thereof is from about 1:1 to about 15:1.

32. The method of claim 31, wherein said molar ratio is from about 1.5:1 to about 8:1.

33. The method of claim 32, wherein said molar ratio is about 2.5:1.

34. The method of claim 22, wherein said solvent is water or a mixture comprising water and an alcohol.

35. The method of claim 34, wherein said alcohol is methanol.

36. The method of claim 34, wherein said solvent is water.

37. The method of claim 34, wherein said TRIS is present in an amount between 1 to 90% by weight of said composition.

38. The method of claim 37, wherein TRIS is present in an amount of 5% by weight of said composition.

39. The method of claim 38, wherein TRIS is present in an amount of 1% by weight of said composition.

40. The method of claim 22, wherein said amine or ammonium derivative thereof comprises between 0.05 to 2.0% by weight of said composition.

* * * * *

UNITED STATES PATENT AND TRADEMARK OFFICE
CERTIFICATE OF CORRECTION

PATENT NO. : 6,986,358 B2
DATED : January 17, 2006
INVENTOR(S) : Mark Andrew Mattox and Edward J. Valente It is certified that error appears in the above-identified patent and that said Letters Patent is hereby corrected as shown below:

<u>Column 13,</u>
Lines 57-60, should read as follows:
-- with at least one amine or ammonium derivative thereof selected from the group consisting of alkylamines, dialkylamines, alkylenediamines, cycloalkylamines, and the conjugate acids thereof in the presence of an aqueous solvent, wherein X is an anion of valency n and is selected from the group consisting of bromide, iodide, lower alkyl carboxylates, bisulfite, bisulfate, hydrocarbyl sulfonates, dihydrogenphosphate, nitrate, hexafluorophosphate, sulfite, monohydrogenphosphate, and phosphate, whereby a second composition is obtained; and --.

Signed and Sealed this

Twenty-eighth Day of March, 2006

JON W. DUDAS
*Director of the United States Patent and Trademark Office*